US008644797B2

(12) United States Patent
MacLean et al.

(10) Patent No.: US 8,644,797 B2
(45) Date of Patent: Feb. 4, 2014

(54) CONTENT-BASED BILLING SERVICE FOR WIRELESS PREPAID SUBSCRIBERS (75) Inventors: Ian MacLean, Dallas, TX (US); Donald Keeler, McKinney, TX (US); Richard J. Bianconi, Rowlett, TX (US); Douglas J. Reeder, McKinney, TX (US)

(73) Assignee: Apple Inc., Cupertino, CA (US)

( * ) Notice: Subject to any disclaimer, the term of this patent is extended or adjusted under 35 U.S.C. 154(b) by 3038 days.

(21) Appl. No.: 10/027,777

(22) Filed: Dec. 26, 2001

(65) Prior Publication Data

US 2003/0120499 A1    Jun. 26, 2003

(51) Int. Cl.
*H04W 4/00* (2009.01)
*G06Q 40/00* (2012.01)
*G06Q 10/00* (2012.01)
*H04W 4/24* (2009.01)
*G06Q 20/10* (2012.01)
*G06Q 10/06* (2012.01)

(52) U.S. Cl.
CPC ............ *H04W 4/24* (2013.01); *G06Q 20/102* (2013.01); *G06Q 10/063* (2013.01)
USPC ............................. 455/406; 705/40; 705/7.11

(58) Field of Classification Search
USPC .......... 705/40, 65, 41, 51–52, 26, 1, 35, 7.11; 709/200; 445/405; 455/423, 461, 436, 455/406; 370/331, 337, 349
See application file for complete search history.

(56) References Cited

U.S. PATENT DOCUMENTS

| | | | | |
|---|---|---|---|---|
| 6,480,485 B1 * | 11/2002 | Kari et al. | ...................... | 370/352 |
| 6,615,034 B1 * | 9/2003 | Alloune et al. | ................ | 455/406 |
| 6,628,954 B1 * | 9/2003 | McGowan et al. | ........... | 455/461 |
| 6,707,813 B1 * | 3/2004 | Hasan et al. | ................... | 370/356 |
| 6,845,238 B1 * | 1/2005 | Muller | .......................... | 455/436 |
| 6,879,834 B2 * | 4/2005 | Virtanen | ..................... | 455/452.2 |
| 6,940,834 B2 * | 9/2005 | Bakke et al. | ................... | 370/331 |
| 6,973,311 B2 * | 12/2005 | Yi-Bing et al. | ................ | 455/436 |
| 7,099,846 B1 * | 8/2006 | Ishibashi et al. | ................ | 705/51 |
| 2001/0019544 A1 * | 9/2001 | Bakke et al. | ................... | 370/331 |
| 2001/0051931 A1 * | 12/2001 | Schweitzer | ...................... | 705/65 |
| 2001/0055291 A1 * | 12/2001 | Schweitzer | ..................... | 370/337 |
| 2002/0025795 A1 * | 2/2002 | Sharon et al. | ................ | 455/405 |

(Continued)

OTHER PUBLICATIONS

Cushnie, Hutchison, and Oliver. Evolution of Charging and Billing Models for GSM and Future Mobile Internet Services. Lecture Notes in Computer Science. Springer Berlin/Heidelberg. Jan. 1/200. p. 312-323.*

(Continued)

*Primary Examiner* — Susanna M Meinecke Diaz
*Assistant Examiner* — Jamie Swartz
(74) *Attorney, Agent, or Firm* — Meyertons, Hood, Kivlin, Kowert & Goetzel, P.C.

(57) ABSTRACT

A method of allowing content-based billing to a prepaid subscriber or subscribers is disclosed. According to one embodiment of the invention, the content-based billing is achieved by forwarding volume limit threshold data normally used by the Serving GPRS support node to the Gateway GPRS support node, which according to the prior art, counted all data bits at the same rate. According to this embodiment, by forwarding the volume limit threshold data to the GGSN, a modified data count is accumulated since billable data is monitored and accumulates, whereas free data does not accumulate. This modified data count is then provided from the gateway GPRS support node to the Serving GPRS support node, which then transmits the accumulated data count to the SCP.

15 Claims, 7 Drawing Sheets (56) References Cited

U.S. PATENT DOCUMENTS

| | | | |
|---|---|---|---|
| 2002/0062467 A1* | 5/2002 | Hunzinger | 714/749 |
| 2002/0089949 A1* | 7/2002 | Bjelland et al. | 370/331 |
| 2002/0127995 A1* | 9/2002 | Faccinn et al. | 455/406 |
| 2002/0128017 A1* | 9/2002 | Virtanen | 455/452 |
| 2002/0129088 A1* | 9/2002 | Zhou et al. | 709/200 |
| 2002/0133412 A1* | 9/2002 | Oliver et al. | 705/26 |
| 2003/0027554 A1* | 2/2003 | Haumont | 455/414 |
| 2003/0037176 A1* | 2/2003 | Dannehr et al. | 709/313 |
| 2003/0083988 A1* | 5/2003 | Reith | 705/40 |
| 2003/0083990 A1* | 5/2003 | Berg et al. | 705/40 |
| 2004/0077332 A1* | 4/2004 | Ephraim et al. | 455/405 |
| 2004/0121755 A1* | 6/2004 | Hurtta | 455/404.1 |
| 2004/0266453 A1* | 12/2004 | Maanoja et al. | 455/456.1 |

OTHER PUBLICATIONS

Cushnie, Hutchison, and Oliver. Evolution of Charging and Billing Models for GSM and Future Mobile Internet Services. Lecture Notes in Computer Science. Springer Berlin/Heidelberg. Jan. 2000. p. 312-323.*

* cited by examiner

CONTENT-BASED BILLING SERVICE FOR WIRELESS PREPAID SUBSCRIBERS

FIELD OF THE INVENTION

The present invention relates to content-based billing services, and more specifically to methods of providing content-based billing services for prepaid wireless subscribers.

BACKGROUND OF THE INVENTION

As will be appreciated by those skilled in the art, the wireless or mobile telephone is no longer simply used for voice communications. Although voice communications remain a primary purpose for many of these communication devices, these devices are being called on to provide the same communication data exchange services demanded by the hard wired communication systems including the transmission of vast amounts of data such as provided through public and private internet connections. However, there exists a substantial infrastructure in place for wireless communication systems. Therefore, the additional challenges of compatibility and incorporation of the existing infrastructure is required while still providing the new services at a reasonable and competitive cost.

Data provided through the internet is available under many different conditions. Some data is free, and other data is provided at different costs and rates. In addition, communication service providers often provide subscription programs with various incentives and variable charges per data bit. Further, for a given service provider, these charges may change as a function of call volume, subscriber location, time of day, and the like. Therefore, to be cost competitive, the wireless service provider should be able to also provide such variable rates.

To accomplish this, recent wireless communications have evolved from the original analog cellular or mobile telephones which used TDMA (Time Division Multiple Access) and was almost entirely limited to voice communications. TDMA was also used with second-generation digital mobile cellular phones that transmitted voice data in digital packets. Transmission by digital packets, however, readily lends itself to the transmission or exchange of vast amounts of non-voice data as well as voice data. In fact, because of the requirements that voice data must be provided at regular and precise intervals if it is to be understood, voice data presents some challenges not present with ordinary or non-voice digital data. In any event, the demands for transmitting various types of digital data has recently exploded, and the processing or packaging of non-voice digital data for transmission over wireless communication systems has developed separately from the processing and packaging of voice data packets. Consequently, the two types of data packets are processed separately and then merged and transmitted over both the second-generation TDMA systems and third generation CDMA (Code Division Multiplex Access) type systems. It should also be noted that CDMA is also used in 2G cellular networks like Sprint PCS and Verizon. It is not required that 3G systems use CDMA, but systems presently being developed are using CDMA.

SUMMARY OF THE INVENTION

Other objects and advantages of the invention will in part be obvious, and will in part appear hereinafter, and will be accomplished by the present invention which provides methods of providing content-based billing to a prepaid subscriber.

The steps of the method according to this invention comprise initiating contact between a first SGSN (Serving General Packet Radio Service Support Node) and an SCP (Server Control Point) regarding the account profile of a prepaid subscriber. The SCP then provides volume limit threshold data to the first SGSN. The volume limit threshold data is then forwarded from the SGSN to a GGSN (Gateway GPRS Support Node). Data packets are then exchanged between the BSC (Base Station Controller) or Radio Network Controller (RNC) and the SGSN in the usual manner as is known by those skilled in the art. However, the billable data count is accumulated at the GGSN according to the specific profile of the prepaid subscriber. According to one embodiment of the invention, and dependent upon the prepaid subscriber account profile, the GGSN will not accumulate a billable data count for data designated as non-billable or "free" data. According to other embodiments, the GGSN may accumulate different types of data at different billing data counts or rates. That is, some types of data may accumulate a data count at a standard rate, whereas other types of data may accumulate at a higher or lesser data count than the standard rate.

In addition, according to another embodiment, a first type of data that does not accumulate a data count at the GGSN is provided at no cost to the subscriber, a second type of data is accumulated at a first rate at the GGSN, a third type of data accumulates at a rate lower than the first rate at the GGSN, and a fourth type of data accumulates at a rate greater than the first rate at the GGSN.

The total data count will then be provided to the SGSN whenever the data exchange between the SGSN and a specific BSC is interrupted. Such an interruption may occur as a result of the call being terminated either voluntarily or in the event of an equipment failure, or when the mobile phone involved with the call moves from one regional area to a new regional area. The total data count will also be transmitted from the GGSN to the SGSN when the accumulated total data count reaches the volume limit threshold set by the SCP. This accumulated data count is then forwarded from the SGSN to the SCP, which then, in the event of the volume limit threshold being reached will either increase the volume limit data threshold count and allow the data exchange to continue, or the SCP will instruct the SGSN to terminate the data exchange. If the call is terminated before the volume limit threshold is reached, the SCP will adjust the overall volume limit threshold available for a subsequent call or data exchange.

In the event the mobile phone is moving from one region to another, the original SGSN will be contacted by a new or second SGSN to allow an uninterrupted "hand off" of the call. The new SGSN will also contact the SCP for the prepaid subscriber profile and information, and the GGSN providing the internet data. The new SGSN will then continue the data exchange process in the same manner as discussed above.

DESCRIPTION OF PREFERRED EMBODIMENTS

Figure 1:
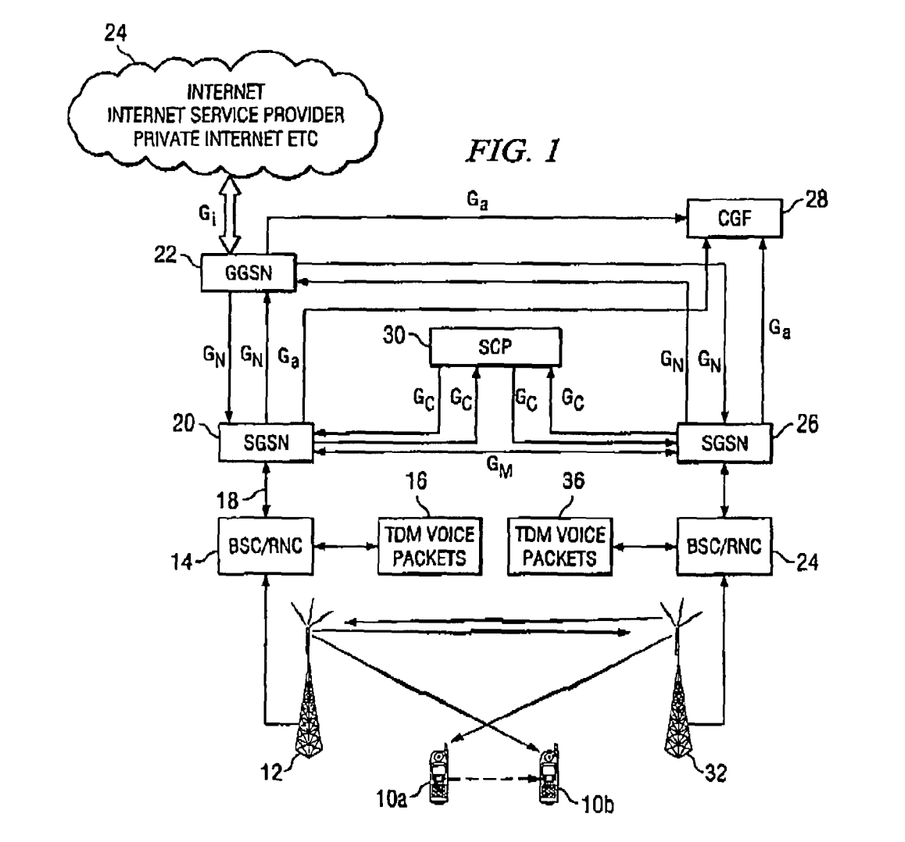
FIG. 1 illustrates a communication set up according to FIG. 1 and further includes providing for content-based billing to prepaid subscribers.

Referring now to FIG. 1, there is shown a functional schematic diagram incorporating the features of the present invention. It will be appreciated that although certain of the functions indicated in the figure, are separated from other functions. Such separation is not intended to suggest that the hardware providing these functions will also be separated. For example, the GGSN (Gateway GPRS Support Node) and the SGSN (Serving GPRS Support Node) may be incorporated as a single piece of hardware or co-located at a single location.

Although details of the signal flow will be discussed hereinafter, a generalized discussion of the functional diagram follows. As shown, a wireless terminal 10 is in communication with a transmission tower 12 in a particular region or area. As used herein, the term "wireless terminal" is applicable to wireless/mobile telephones, terminals in the form of combinations of wireless Personal Digital Assistants (PDAs or "Palm Pilots") and mobile telephones, wireless networking cards connected to stationary or mobile equipment, and the like. The transmission tower 12 is itself in communications with a controller 14 such as a BSC (Base Station Controller) or Radio Network Controller (RNC) which receives and combines both voice packets indicated at 16 and data packets provided by signal 18 from a first support node such as a Serving GPRS Support Node (SGSN) 20 available from the Nortel Networks. The SGSN is itself in communication with a Gateway GPRS Support Node (GGSN) 22 which provides the gateway to the internet services which will include normal internet data service, provider data, and private internet data as indicated at 24. It is also noted that the GGSN 22 may also be in communication with other SGSNs such as a second SGSN 26. Although FIG. 1 indicates two SGSNs in communication with a single GGSN, it will be appreciated by those skilled in the art that GGSN 22 may in fact be in contact with a large number of SGSNs. Likewise, although one GGSN 22 is shown as being in contact with SGSN 20 and SGSN 26, it will be appreciated that each SGSN may be in contact with a number of GGSNs. It should also be noted that SGSN 20 is also in contact with CGF (Charging Gateway Function) as is SGSN 26. Likewise, both SGSN 20 and SGSN 26 are in communication with a service control point such as SCP 30 shown in FIG. 1.

FIG. 1 includes a second SGSN 26 for purposes of illustrating how wireless terminal 10 may be in the form of a mobile terminal capable of movement from the first location where it is in radio communication with transmitting tower 12 to a second location as indicated at 10a where it is in communication with a second transmission tower 32 located in a different region. Likewise, tower 32 is in communication with a second controller BSC/RNC 24 that, in turn, is in communication with a second TDM voice packet controller 36, and as discussed, is in communication with SGSN 26 for exchanging data packets other than voice data packets.

As will be appreciated, non-voice digital packets typically originate from the public internet, internet service providers or private internet systems as indicated by internet "cloud" 24 in FIG. 1. As will also be appreciated by those skilled in the art, much of the data available from the internet cloud 24 can be provided at no cost, whereas much of the other types of data may be provided at varying costs including minimal costs or in some cases a very high cost. Thus, if the wireless communications service provider is to provide such data to the user, there must be a way to charge for the non-free data. Thus, the gateway GPSR support node (GGSN) 22 is provided to keep track of the non-free internet data and provides the chargeable information to the CGF 28. The GGSN 22 also keeps track of the total amount of data bits provided and transmitted to SGSN 20. The SGSN 20, on the other hand, according to the prior art, was used to also keep track of the amount of data bits exchanged with the hand held unit 10. Further, since most wireless systems charge on the basis of the number of data bits or data bit packages transmitted in either direction, the data bit counts accumulated by SGSN 20 provided this information to the SCP 30 for control and accounting purposes. This prior art system works reasonably well so long as the SGSN 20 can charge the same rate for all data passing between SGSN 20 and the hand held unit 10. Thus, the SCP can determine the cost and the amount of time used by the wireless handheld unit, whereas the CGF can keep track of the internet data transmissions that are not free. This of course requires separate billings. However, for advertising and various marketing and sales techniques, most wireless providers prefer to control the billing and therefore offer subscribers a number of prepaid minutes and would like to be able to offer a portion of the free internet data at no charge to the customer. Further, it also would be desirable to be able to provide accumulated charge data counts at different rates depending upon the cost of the data bits from the internet source 24. Thus, the present invention, although using substantially the same functional equipment available for present communication connections between handheld units and the internet, provides the opportunity for such content-based billing to prepaid subscribers.

Figure 2A:
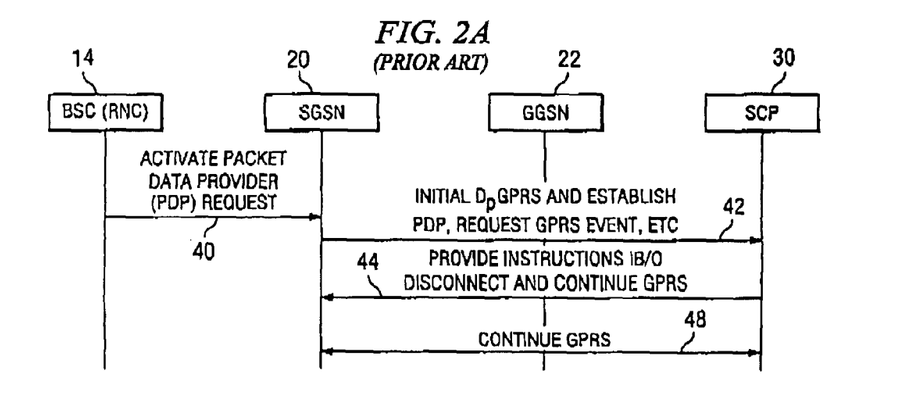
FIGS. 2a, 2b, 2c, 2d and 2e illustrate the prior art signal exchanges for establishing communication channel scheme without content-based billing.

Referring now to FIGS. 2a, 2b, 2c, 2d and 2e, there is shown a signal flow diagram typically used in a prior art system for charging a pre-paid customer according to the number of data bits exchanged. FIGS. 3a, 3b, 3c, 3d and 3e are substantially similar to those FIGS. 2a-2e except they include the novel features of this invention used for content-based billing to prepaid subscribers. As shown in FIG. 2a, a base station controller such as BSC 14 receives a request or communication indicating a need for packet data from a packet data provider as indicated by signal 40. Although the wireless terminal 10 may also be used for the transmission of voice packets such as for normal telephone communications, the remaining discussion will be with respect to the communication of data other than voice packets. SGSN 20 will receive the request for packet data from a particular provider and will in turn contact the SCP 30 to determine if the subscriber is authorized to connect to the internet. Although the handshaking process between the SGSN 20 and SCP 30 actually comprises more than one communication, this process is well known to those skilled in the art and therefore, signal 42 represents all of the different communications necessary. Thus, it is seen that the initial signals from the SGSN 20 to SCP 30 not only establish contact with the packet data provider, but also provide the requesting information to the SCP, which is then compared to the subscriber's profile to determine what services are available to a particular subscriber. Once the SCP 30 evaluates the subscriber's profile, necessary information and instructions including the volume limit threshold data is transmitted back from the SCP 30 to SGSN 20 by signal 44. It should be noted at this point, that for a specific prepaid subscriber, the SCP 30 simply relays back the volume limit threshold, which represents the total number of data bits prepaid by the subscriber. SCP 30 will then provide instructions to continue with the GPRS data exchange as indicated by signal 48. At this point, it should be noted that there have been no instructions or data exchange signals between SGSN 20 and GGSN 22 for these initial contact procedures or signaling procedures used by the prior art.

Figure 3A:
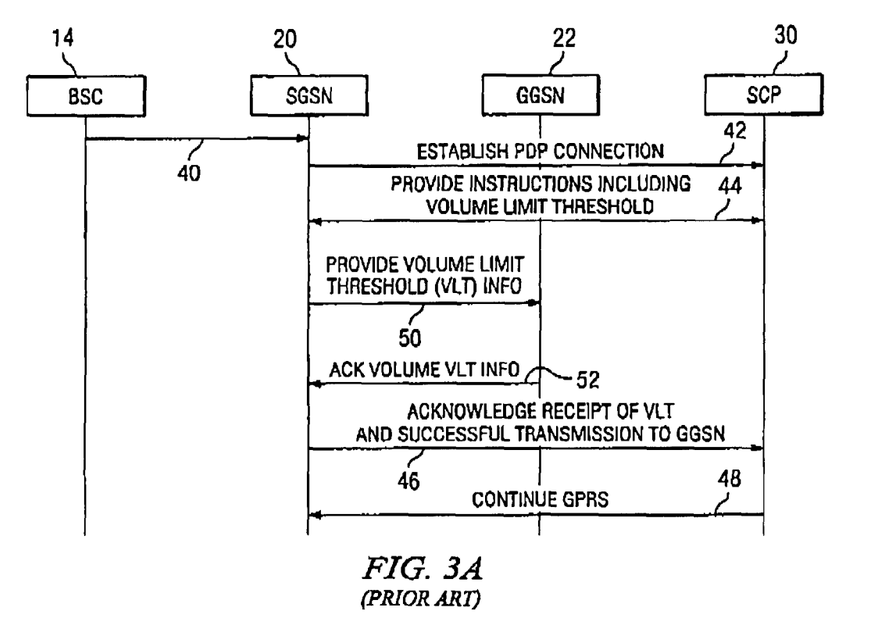
FIGS. 3a, 3b, 3c, 3d and 3e illustrate the signal exchanges for establishing a communication scheme, which includes content-based billing of prepaid subscribers according to the teachings of the present invention.

Signals representing functions, which are common to both the prior art initiation procedure of FIG. 2*a* and the new procedure of this invention as shown in FIG. 3*a*, will carry the same reference numbers. Therefore, as shown in FIG. 3*a*, and as was the case with respect to the prior art, the BSC 14 requires the activation of a packet data provider communication set up as indicated by signal 40. Also as was the case with respect to the prior art, this data is provided from the SGSN 20 to SCP 30 as indicated by signal 42. Then as indicated by signal 44, SCP 30 provides the necessary instructions and information (including volume limit threshold data) to SGSN 20. As discussed above, the SCP may provide different instructions to the SGSN depending on the subscriber profile. For example, in addition to providing the volume limit threshold in the event of a paid up and current account, the SCP 30 may instead instruct SGSN 20 to terminate or disconnect the PDP [Packet Data Protocol] Context request if the customer profile indicates the account is in arrears or has not authorized such information or data to be provided. However, in the event of a current account, the volume limit threshold data will be provided to the SGSN 20 as discussed above. Unlike the prior art sequence of signals as discussed with respect to FIG. 2*a*, according to the present invention, once the SGSN 20 receives the instructions or data from SCP 30, the volume limit threshold data information is forwarded to the GGSN 22, as indicated by signal 50. Upon receiving the volume limit threshold data from the SGSN 20, GGSN 22 will then acknowledge this information and sends an acknowledging signal as shown on signal 52 to SGSN 20. SGSN 20 then send an acknowledgment of receipt of the data from SCP 30 and also transmits the fact the volume limit threshold data was successfully forwarded to GGSN on signal 46 back to SCP 30. Then, as was the case with respect to the prior art, SCP 30 instructs the SGSN 20 to continue as indicated by signal 48.

Figure 2B:
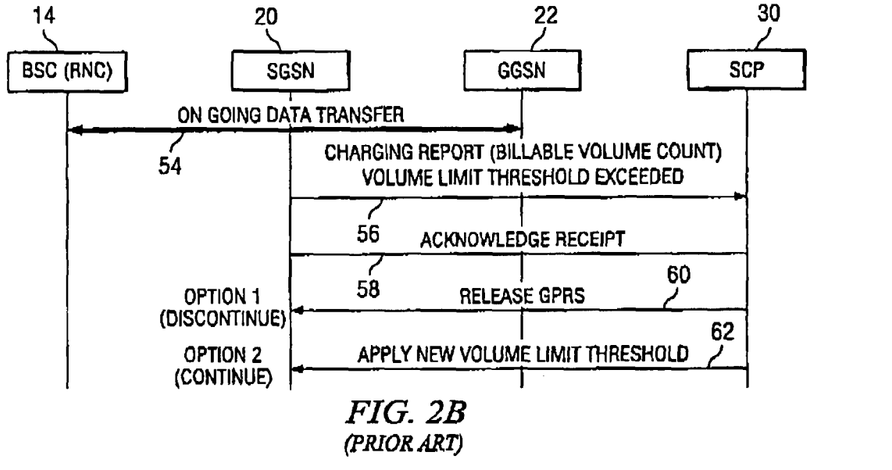
Figure 2C:
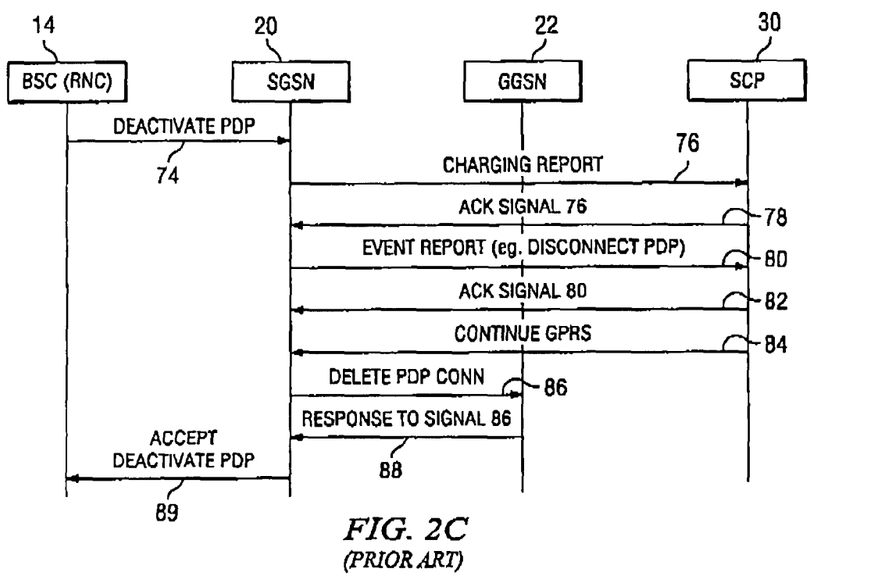

Referring now to FIG. 2*b*, there is illustrated the prior art data exchange and control signal flow. As shown, upon receiving the instruction to continue the GPRS data exchange on signal 48 from the SCP 30, as was illustrated in FIG. 2*a*, there is then an ongoing data transfer in both directions as indicated by the double-headed arrow 54. According to the prior art, both the GGSN 22 and the SGSN 20 simply monitored the total number of data bits passing there between. Since all data bits were counted by both the GGSN 22 and the SGSN 20, these numbers should agree according to the prior art procedure. Therefore, once the SGSN 20 data count reaches (or is equal to) the volume limit threshold as instructed by SCP 30, SGSN 20 provides a signal to SCP 30 indicating the volume limit threshold count has been reached. In addition, both the SGSN 20 and the GGSN 20 provide the data count to the CGF 28. Thus, there is verification of the data count accuracy. The signal from SGSN 20 to SCP 30 indicating that the volume limit threshold has been reached is indicated by signal 56. SCP 30 then acknowledges receipt of the information on the return signal 58 and begins evaluating the subscriber's profile. Upon completing the evaluation of the subscriber's accounting profile, SCP 30 then instructs the SGSN 20 to either terminate the PDP data exchange as indicated by signal 60, or alternately and assuming a favorable accounting record history, the SGSN 20 instead of instructing termination of the PDP data exchange may send a modified volume limit threshold value to the SGSN 20. This signal to modify the volume limit threshold is indicated at signal 62.

Figure 3B:
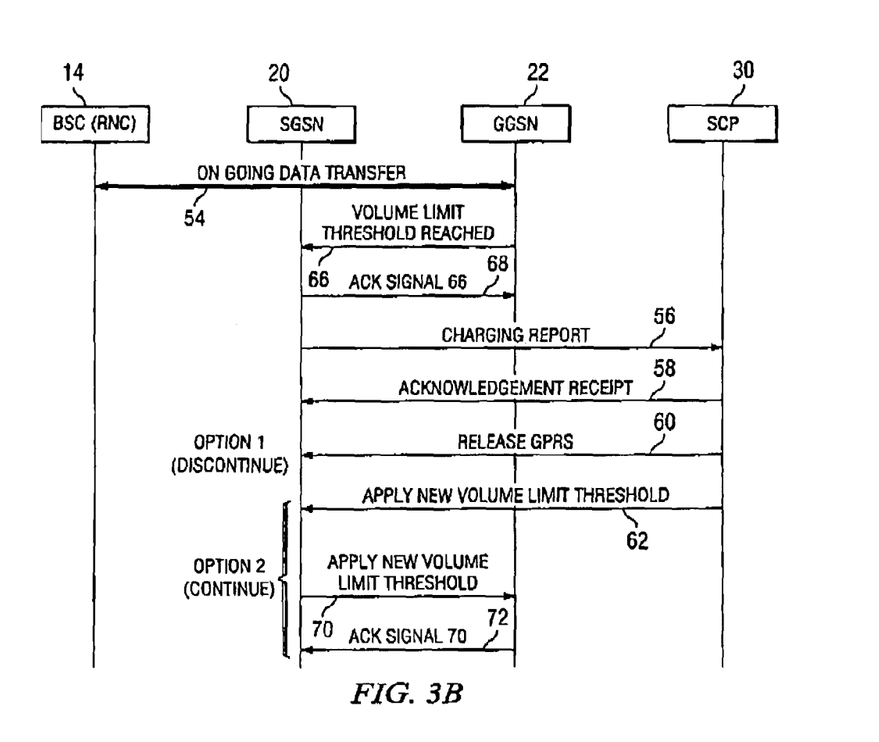
Figure 3C:
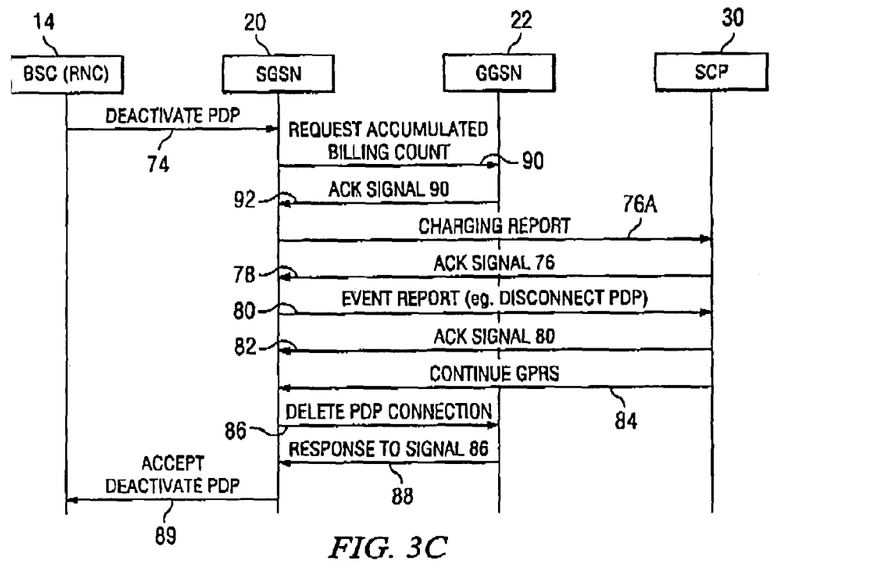
Figure 3D:
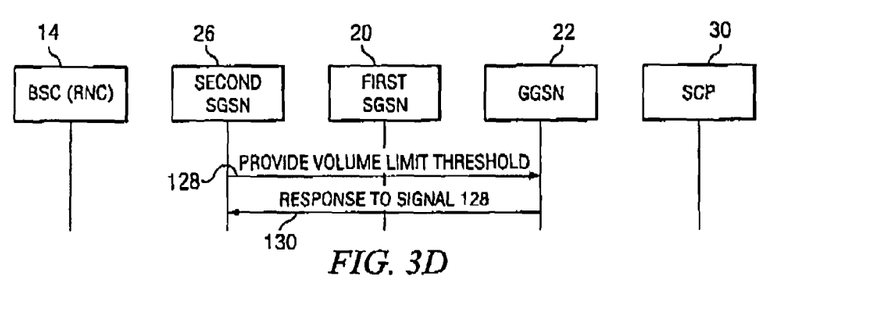

Referring now to FIG. 3*b*, there is shown a signal flow diagram similar to that of the prior art FIG. 2*b*, except this diagram includes modifications according to the present invention. Again, as was the case with FIGS. 2*a* and 3*a*, signal flow, which is the same for the prior art and the present invention carry the same reference numbers. Thus, as shown, and as was the case in the prior art, the ongoing data transfer occurs as indicated by signal 54. However, unlike the prior art, it will be recalled that the GGSN 22 now also possesses the information related to the volume limit threshold representing the number of data bits prepaid and allowed to be transferred between the SGSN and the GGSN without further charge. Thus, it should be appreciated that for data bit exchange indicated as being free according to the prepaid subscriber's profile, the GGSN 22 will accumulate data at a slower and lesser rate than the SGSN 20. Thus, according to this embodiment of the invention, The SGSN 20 will not report that the volume limit threshold number of data bits has been reached to SCP 30 until instructed to do so by the GGSN 22 no matter what its own count of the data bits. Thus, only when GGSN 22 also has a data count which indicates that the volume limit threshold has been reached, will GGSN 22 send this information to SGSN 20 as indicated by signal 66. SGSN 20 will then acknowledge receipt of this information as indicated by signal 68. SGSN 20 will also send a signal 56 indicating that the volume threshold limit has been reached or exceeded as was done in the prior art and discussed with respect to FIG. 2*b*. The signal flow for this invention from this point is the same signal flow as the prior art except that once the SCP 30 has provided a new volume limit threshold limit to SGSN 20 to allow continuing of the GPRS data exchange as indicated by signal 62, SGSN 20 then forwards this new volume limit threshold information to GGSN 22 as indicated by signal 70. Receipt of this new volume limit threshold information is then acknowledged by the GGSN as indicated in signal 72.

As was mentioned earlier, the subscriber receiving the internet data exchange will normally complete such a data exchange before the prepaid number of data bits or the threshold volume limit is reached. Thus, this subscriber will simply hang up or otherwise deactivate the data exchange with the internet. Therefore, referring now to FIG. 2*c* such deactivation is indicated by the deactivation signal 74 from the BSC 14 to the SGSN 20. According to the prior art, upon receiving a notice of deactivation on signal 74, the SGSN 20 simply provided the data bit volume count to SCP 30 as indicated by signal 76. It will be appreciated that this was quite acceptable according to the prior art since the data bit count in the SGSN 20 and the GGSN 22 were the same. Then according to the prior art, the SCP 30 would simply respond with an acknowledgment that the billing count had been received as indicated by signal 78. After the acknowledgment by SCP 30 by signal 78, the final handshaking and disconnect procedure as indicated by signals 80, 82, 84, 86 and 88 in FIG. 2*c* would then take place to complete the disconnect and delete the PDP connections. The signal flow according to the present invention, as was the case in the previous two examples, illustrated in FIGS. 3*a* and 3*b*, for such a packet data provider deactivation has some similarity to the prior art and therefore includes many of the same signals. However, it will be recalled that according to the invention the data count for GGSN 22 will be lower than the data count for SGSN 20 in the event free (no charge) data was being transmitted between GGSN 22 and SGSN 20. Consequently, rather than simply sending the data count from SGSN 20 directly to SCP 30, SGSN 20 must first request or retrieve the accumulated billable traffic count from GGSN 22 as indicated by signal 90. GGSN 22 then provides this reduced data count representing a data count which does not include the free data to SGSN 20 as indicated by signal 92. This revised data count is then provided to the SCP 30 from SGSN 20 as indicated by the signal 76A. It should be appreciated that the information provided by signal 76 in FIG. 2a of the prior art, and signal 76A in FIG. 3a according to the present invention would likely be different since, the SCP 30 only receives a chargeable data count and is not concerned with the fact that the data count is only for some of the data bit and may not contain a complete data count. Thus, there has been described to this point a typical scenario between initiation of a PDP connection followed by a normal deactivation in a situation where the volume limit threshold was exceeded and a new volume limit threshold determined.

According to another embodiment, a first type of data that does not accumulate a data count at the GGSN is provided at no cost to the subscriber, a second type of data is accumulated at a first rate at the GGSN, a third type of data accumulates at a rate lower than the first rate at the GGSN, and a fourth type of data accumulates at a rate greater than the first rate at the GGSN.

However, it will also be appreciated by those skilled in the art as was indicated in FIG. 1, that wireless telephones and communication devices are most effective as a mobile system. Therefore, as often happens, the wireless terminal 10 may be in the form of a mobile terminal capable of movement beyond the transmission limits of tower 12 and the corresponding BSC 14, and therefore, if data exchange is to continue, it must be picked up by a different BSC/RNC 24 and transmitting tower 32. Therefore, referring now to FIGS. 2d and 2e, there is illustrated an example of the prior art control signal flow which provides for a "hand off" between the control tower 12 and BSC/RNC 14 to the control tower 32 and BSC/RNC 24. This signal flow is indicated by signals 94 through 116 in FIG. 2d, and signals 118 through 132 in FIG. 2e. Since each signal indicates its purpose and is similar to that discussed with the previous figures, these figures will be discussed generally and in less detail than the previous figures. For example, referring to FIG. 2d and as will be appreciated by those skilled the art, before handset 10 moves beyond the transmission limits of tower 10, transmissions from handset 10 are picked up by tower 32 and BSC/RNC 24 in the same manner as the BSC/RNC 14. At some signal level threshold, another or second SGSN 26 will see this signal transmission as a connection request as indicated by signal 94. At this point, SGSN 26 will set up a handshake procedure with the old or first SGSN 20 as indicated by signals 96, 98 and 100 indicating to SGSN 20 that it will be taking charge of the communication. Once SGSN 26 sends an acknowledgment (signal 100) to SGSN20, SGSN 26 will then modify the existing PDP Context by notifying the GGSN that SGSN 26 is now serving this PDP Context as indicated by signals 102 and 104. As soon as the GGSN 22 has indicated that the request has been received, BSC 34 will accept the hand off as indicated by signal 106 and then contact SCP 30 as indicated by signal 108 in the same manner as the first SGSN 20 contact and the SCP30 when making the initial connection. SCP 30 will then provide the appropriate instructions to the second SGSN 26, which may include a first option of instructing SGSN 26 to disconnect, as indicated by signal 112. That is, the data exchange connection is not appropriate or authorized with the new gateway 34.

Figure 2D:
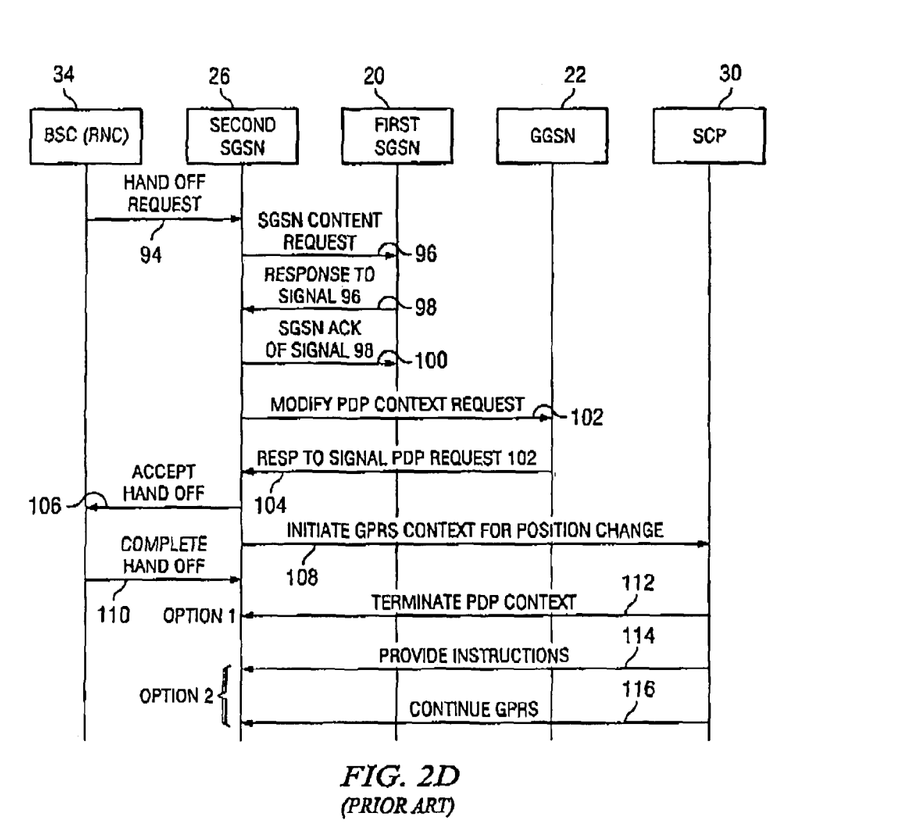

Alternately, SCP30 will provide the necessary charging information to the SGSN 26 as indicated by signal 114, and indicate that the data transfer should continue as indicated by signal 116. At this point in the same manner as occurred between the first SGSN 20 and GGSN 22, the second SGSN 26 will send the necessary billing information including the new volume limit threshold for non-chargeable data as indicated by signal 128 to GGSN 22. GGSN 22 will then respond that it has received this information as indicated by signal 136.

Figure 2E:
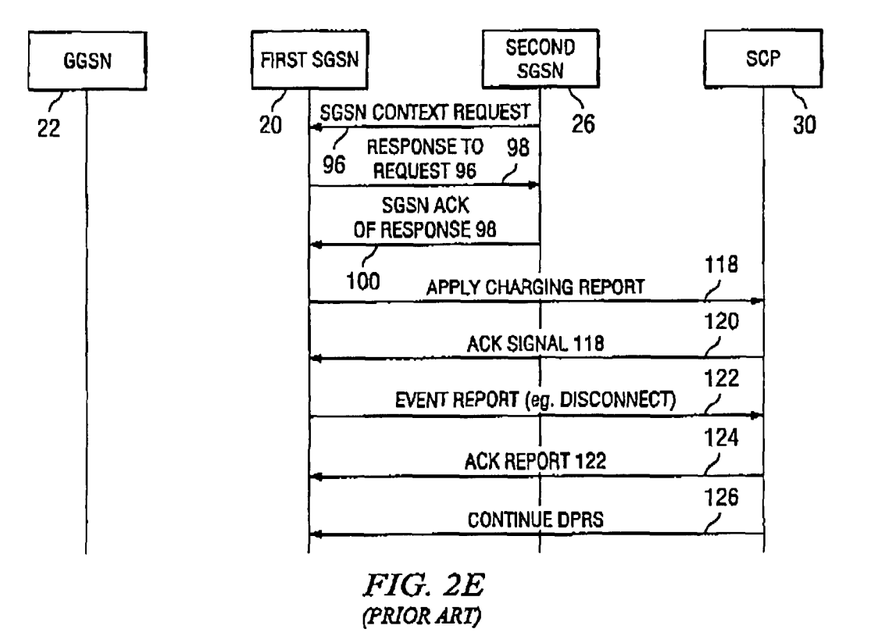
Figure 3E:
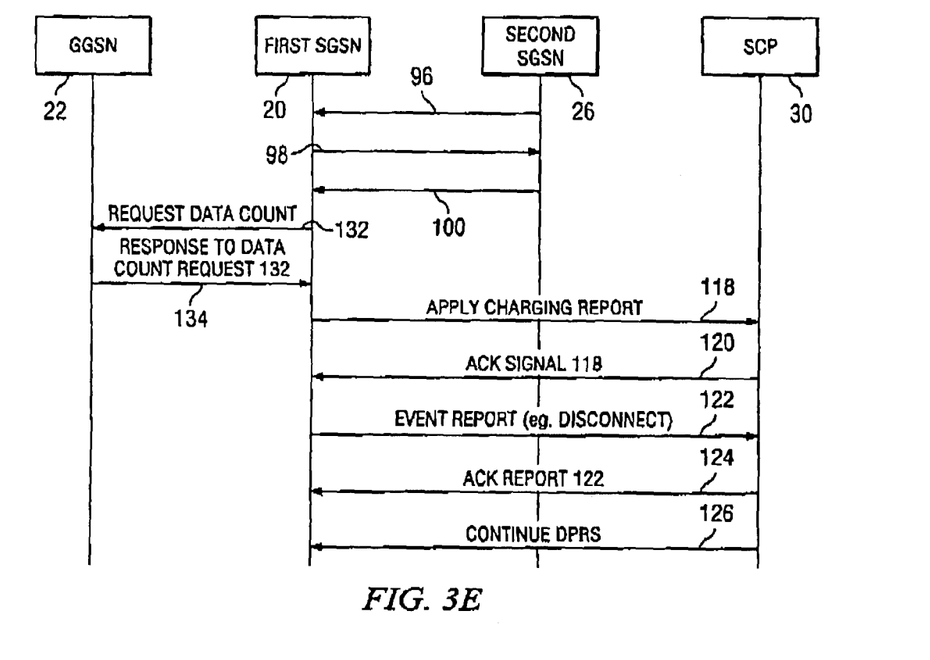

Referring now to FIGS. 2e and 3e, there is shown the handshake release or pass off of the first SGSN 20 to the second SGSN 26. As shown, signals 96, 98 and 100 are the same signals as in the prior art FIG. 2d. However, after the second SGSN 26 has acknowledged the contact as indicated by signal 100, according to the prior art technique, SGSN 20 provided SCP 30 with the appropriate accumulated billing volume count as indicated by signal 118. As discussed above, since the SGSN 20 and the GGSN 22, according to the prior art procedure, should have identical data count, the report as indicated by signal 118 could be provided immediately. Signals 120 through 126 illustrate the prior art appropriate acknowledgment, disconnects, etc. as determined by the demands of the system. However, as shown in FIG. 3e, after the second SGSN 26 acknowledges contact with the first SGSN 20, SGSN 20, according to the present invention, requested the volume data count from GGSN 22 as indicated by signal 132. This information is then provided from GGSN 22 to SGSN 20 as indicated by signal 134, and then this amount is provided from the first SGSN 20 to SCP 30 by signal 118.

Thus, there has now also been discussed appropriate signal flow according to the teachings of this invention for allowing the hand off of a wireless handset from one SGSN to a new SGSN.

Figure 4:
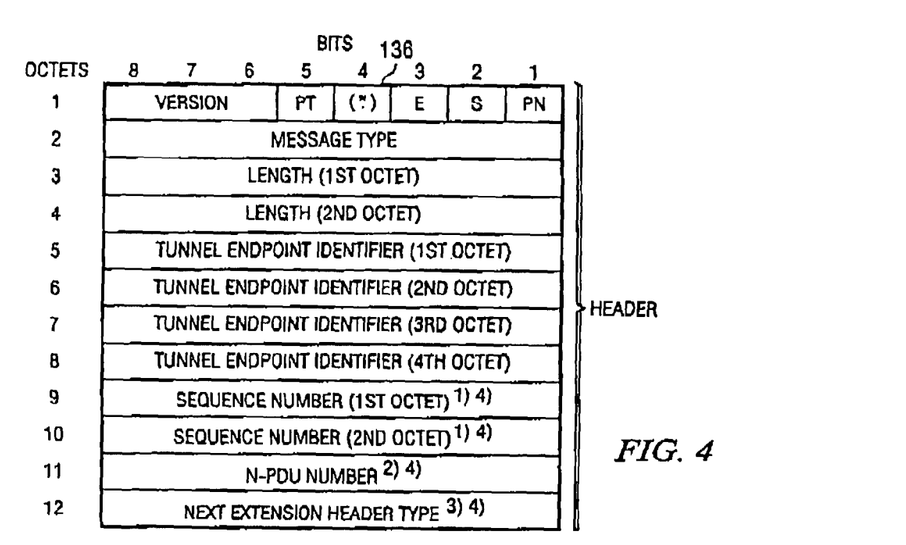
FIG. 4 illustrates an alternate embodiment for providing down-link content-based billing for prepaid subscribers using the prior art signal exchanges of FIGS. 2a, 2b and 2c, but designating a data bit in the down link data frame header as billable or not billable.

Another embodiment of the present invention, which enables a modified version of content-based billing for prepaid subscribers, is discussed with respect to FIG. 4. The embodiment shown in FIG. 4 is simpler than the previously discussed embodiment in that it eliminates the need for any additional signaling by using private or proprietary extensions between the GGSN and the SGSN. The traffic volume control and thresholds monitoring in the SGSN is also the same as was discussed with respect to the prior art. According to this embodiment, and referring to FIG. 4, an unused bit of the GTP-U header on a data packet, such as spare bit 4 shown in the figure, at reference under 136 will be set to a 1 for non-billable packets of data. One is selected since zero is the normal default condition and will continue to indicate a billable packet data unit. However, it is to be appreciated that only down link traffic can be classified as billable versus non-billable, and all up link traffic will be recorded as billable. This characteristic notwithstanding, this approach may be desirable for a multitude of situations in view of its simplicity in deployment and management.

Thus, there has to this point been described the unique methods of this invention for providing content-based billing for use with prepaid subscribers. However, although the present application has been described with respect to specific methods, it is not intended that such specific references be considered limitations upon the scope of the invention except as is set forth in the following claims.

What is claimed:

1. A method of providing content-based billing to a prepaid wireless subscriber of transmitted data, said transmitted data including a first type having a first charge rate and a second type having a second charge rate, said method comprising the steps of:

exchanging information, by a first Serving General Packet Radio Service Support Node (SGSN), with a Server Control Point (SCP), said information regarding said prepaid subscriber;

receiving from the SCP, by said first SGSN, a volume limit threshold of said second type of data, said volume limit threshold associated with said prepaid subscriber;

forwarding, by said first SGSN, said volume limit threshold for said second type of data to a Gateway GPRS Support Node (GGSN);

accumulating a data count at said first SGSN comprising both said first type of data and said second type of data;

receiving from said GGSN, by said first SGSN, a billable data count comprising said second type of data, wherein said billable data count is one of two or more data counts accumulated by said GGSN according to a profile of a prepaid subscriber, said two or more billable data counts each having a different billable data rate, a data count comprising the first type of data not being accumulated at said GGSN, wherein said receiving said billable data count occurs when said billable data count reaches said volume limit threshold; and providing said billable data count from said first SGSN to said SCP.

2. The method of claim 1 further comprising receiving said billable data count if an exchange of data between a Base Station Controller/Radio Network Controller (BSC/RNC) and said first SGSN is interrupted before said volume limit threshold is reached.

3. The method of claim 1, further comprising the steps of receiving from said SCP a new volume limit threshold for said second type of data and forwarding said new volume limit threshold for said second type of data to said GGSN.

4. The method of claim 1 further comprising the step of receiving, by said first SGSN, information to release or terminate communications with a Packet Data Provider (PDP).

5. The method of claim 1 wherein said first type of data is provided at no cost to the subscriber and does not accumulate a data count at said GGSN, a second type of data is accumulated at a first rate at said GGSN, a third type of data accumulates at a rate lower than said first rate at said GGSN, and a fourth type of data accumulates at a rate greater than said first rate at said GGSN.

6. The method of claim 1 further comprising the step of said first SGSN exchanging data with a Base Station Controller (BSC) and said GGSN.

7. The method of claim 4 wherein said information to release or terminate is provided from said SCP.

8. The method of claim 1 and further comprising the steps of:

receiving, by said first SGSN, an indication from a second SGSN indicating a mobility transfer;

receiving, by said first SGSN, said accumulated billing data count from said GGSN;

providing, by said first SGSN, said accumulated data count to said SCP;

terminating communications between said SCP and said first SGSN with respect to said prepaid subscriber;

establishing communications between said second SGSN and said SCP with respect to said prepaid subscriber;

receiving, by said second SGSN, volume limit threshold data from said SCP;

forwarding said volume limited threshold for said second type of data from said second SGSN to said GGSN;

accumulating a data count at said second SGSN comprising both said first type of data and said second type of data;

receiving, from said GGSN, by said second SGSN, a second billable data count comprising said second type of data according to said prepaid subscriber profile, said second billable data count not comprising said first type of data, wherein said receiving said billable data count occurs when said second billable data count reaches said volume threshold limit; and providing said second billable data count from said second SGSN to said SCP.

9. The method of claim 8 further comprising receiving said accumulated billable data count prior to attainment of said volume limit threshold.

10. The method of claim 8 further comprising the steps of receiving, by said second SGSN, from said SCP a new volume limit threshold for said second type of data and forwarding said new volume limit threshold for said second type of data from said second SGSN to said GGSN.

11. The method of claim 8 further comprising the step of receiving, by said second SGSN, information to release or terminate communications with a Packet Data Provider (PDP).

12. The method of claim 8 wherein communication between said second SGSN and said SCP is established prior to termination of communication between said first SGSN and SCP.

13. The method of claim 8 further comprising the step of exchanging information between said first SGSN and said second SGSN.

14. The method of claim 8 further comprising the steps of said second SGSN exchanging data with a second BSC and said GGSN.

15. The method of claim 1 wherein the charge rate of said first type of data is provided at no cost to the subscriber.

* * * * *